(12) United States Patent
Tripathi et al.

(10) Patent No.: US 10,245,959 B2
(45) Date of Patent: Apr. 2, 2019

(54) POWER CONVERTER SYSTEM AND METHOD OF MANUFACTURING THEREOF

(71) Applicant: Nanyang Technological University, Singapore (SG)

(72) Inventors: Anshuman Tripathi, Singapore (SG); Satyajit Athlekar, Singapore (SG); Nishanthi Duraisamy, Singapore (SG)

(73) Assignee: Nanyang Technological University, Singapore (SG)

( * ) Notice: Subject to any disclaimer, the term of this patent is extended or adjusted under 35 U.S.C. 154(b) by 504 days.

(21) Appl. No.: 14/877,583

(22) Filed: Oct. 7, 2015

(65) Prior Publication Data

US 2016/0096437 A1    Apr. 7, 2016

(30) Foreign Application Priority Data

Oct. 7, 2014    (SG) .............................. 10201406378T

(51) Int. Cl.

| | |
|---|---|
| *H02J 3/14* | (2006.01) |
| *H02J 1/00* | (2006.01) |
| *B60L 11/18* | (2006.01) |
| *H02J 7/00* | (2006.01) |
| *H02J 3/38* | (2006.01) |
| *H02M 3/158* | (2006.01) |
| *H02J 4/00* | (2006.01) |

(52) U.S. Cl.
CPC .......... *B60L 11/1809* (2013.01); *H02J 3/381* (2013.01); *H02J 7/00* (2013.01); *H02J 3/383* (2013.01); *H02J 3/386* (2013.01); *H02J 4/00* (2013.01); *H02M 3/158* (2013.01); *Y02E 10/563* (2013.01); *Y02E 10/763* (2013.01); *Y02E 60/721* (2013.01); *Y04S 10/126* (2013.01)

(58) Field of Classification Search
CPC .. H02J 7/00; H02J 7/007; H02J 7/0021; H02J 7/0052; H02J 1/00; H02J 1/02; H02J 4/00; H02J 9/04; H02J 9/00; H02J 3/38; H02J 3/32; H02J 3/34; H02J 3/30; H02M 1/10; G05B 15/02; B60L 11/18; B60L 11/1866; B60L 11/1801; B60L 11/1803
USPC ............ 307/31, 25, 43, 66, 64, 82; 320/109
See application file for complete search history.

(56) References Cited

U.S. PATENT DOCUMENTS

| | | | |
|---|---|---|---|
| 8,228,034 B2* | 7/2012 | Guatto .............. | H01M 10/4207 307/65 |
| 9,548,619 B2* | 1/2017 | Gazit .................... | H02J 7/0018 |

(Continued)

*Primary Examiner* — Fritz M Fleming
*Assistant Examiner* — Jagdeep Dhillon
(74) *Attorney, Agent, or Firm* — Alston & Bird LLP

(57) ABSTRACT

There is provided a power converter system including a power bus, a plurality of power converter modules connected to the power bus in parallel, a plurality of energy storage modules, each energy storage module coupled to the power bus via a corresponding one of the plurality of power converter modules, and a controller module configured to control at least one of the power converter modules to operate in one of a plurality of operating modes. In particular, the plurality of operating modes of the power converter module includes a plurality of charging power conversion modes for connecting an input power source to the corresponding energy storage module for charging power to the corresponding energy storage module. There is also provided a corresponding method of manufacturing the power converter system.

18 Claims, 7 Drawing Sheets

(56) References Cited

U.S. PATENT DOCUMENTS

| | | | |
|---|---|---|---|
| 2011/0084648 A1* | 4/2011 | Cao | H01M 10/44 320/103 |
| 2011/0089760 A1* | 4/2011 | Castelaz | H02J 4/00 307/25 |
| 2015/0180230 A1* | 6/2015 | Xu | H02M 1/10 307/32 |
| 2015/0280466 A1* | 10/2015 | Owen | H02J 7/0013 320/107 |
| 2016/0036100 A1* | 2/2016 | Wang | H01M 10/615 320/127 |
| 2016/0082858 A1* | 3/2016 | Yang | H02J 1/10 318/139 |
| 2016/0134125 A1* | 5/2016 | Holmberg | H02J 5/00 307/82 |
| 2017/0331325 A1* | 11/2017 | Ristau | H02J 3/14 |

\* cited by examiner

POWER CONVERTER SYSTEM AND METHOD OF MANUFACTURING THEREOF

CROSS-REFERENCE TO RELATED APPLICATION

This application claims the benefit of priority of Singapore Patent Application No. 10201406378T, filed 7 Oct. 2014, the content of which being hereby incorporated by reference in its entirety for all purposes.

TECHNICAL FIELD

The present invention generally relates to a power converter system and a method of manufacturing thereof.

BACKGROUND

A power converter system (power transfer system) is required to convert/transfer power from an input power source to an energy storage device and/or an electrical load in various applications such as in electric vehicles (EVs), power distribution systems, and renewable energy conversion systems. This is because, for example, the type of the input power source and the type of the energy storage device and/or the electrical load may be different (e.g., alternating current (AC) type or direct current (DC) type). Therefore, various power conversions are required such that the input power source, the energy storage device, and the electrical load are operationally compatible.

There are various problems associated with conventional power converter systems such as a large component count in the power converter system leading to reduced reliability, restriction on the source and load type, lack of redundancy and fault tolerance, and lack of modular and scalable power conversion. For example, in existing EVs, a dedicated power train system is required for each of the charging and discharging functionalities. Moreover, with improvements in the EVs such as all-wheel driven EVs using in-wheel motors requiring the use of multiple energy sources, the number of converters in the power train systems in the EVs increases significantly. Multiple conversions will prove to be power inefficient. In this regard, every power conversion requires hardware. For instance, in an electrically propelled car, the single or multiple motors are controlled by power electronic devices which convert a DC battery voltage into variable frequency variable voltage power supply to feed the motors. Every such a device is non-ideal and may have an efficiency in a range of about 93% to 95%. This efficiency appears to be high but when the combined efficiency is derived, it may be close to about 80% to 85%. Therefore, such a conventional arrangement/configuration involving such a high loss in the combined efficiency is undesirable.

Additionally, the increase in volume and weight of the power train systems would also lead to reduced fuel efficiencies. For example, every additional converter adds weight and space as well as requiring cooling which adds further complexity and weight to the heat management system. Furthermore, with every component that is added to the system, the reliability at the system level decreases in general.

A need therefore exists to provide a power converter system which seeks to overcome, or at least ameliorate, one or more of the deficiencies of conventional power converter systems. It is against this background that the present invention has been developed.

SUMMARY

According to a first aspect of the present invention, there is provided a power converter system comprising:
a power bus;
a plurality of power converter modules connected to the power bus in parallel;
a plurality of energy storage modules, each energy storage module coupled to the power bus via a corresponding one of the plurality of power converter modules; and
a controller module configured to control at least one of the power converter modules to operate in one of a plurality of operating modes,
wherein the plurality of operating modes of the power converter module comprises a plurality of charging power conversion modes for connecting an input power source to the corresponding energy storage module for charging power to the corresponding energy storage module.

In various embodiments, the plurality of charging power conversion modes comprises an alternating current (AC) to direct current (DC) power conversion mode and a DC to DC power conversion mode.

In various embodiments, the plurality of charging power conversion modes further comprises a DC to AC power conversion mode.

In various embodiments, the plurality of operating modes of the power converter module further comprises a plurality of discharging power conversion modes for connecting the corresponding energy storage module to an electrical load for discharging power to the electrical load.

In various embodiments, the plurality of discharging power conversion modes of the power converter module comprises a direct coupling mode for coupling power from the corresponding energy storage module to the electrical load without power conversion, a DC to AC power conversion mode, and a DC to DC power conversion mode.

In various embodiments, the power converter module comprises a power converter circuit configured to be switchable by the controller module to operate in any one of the plurality of operating modes.

In various embodiments, the power converter circuit comprises a plurality of switches that may be actuated by the controller module for switching the power converter circuit to operate in any one of the plurality of operating modes.

In various embodiments, the controller module is configured to detect a type of the input power source coupled to the power converter system and control the at least one power converter module to operate in one of the plurality of operating modes based on the type of the input power source detected.

In various embodiments, the controller module is configured to detect a type of an electrical load connected to the power converter system and control the at least one power converter module to operate in one of the plurality of operating modes determined based on the type of electrical load detected.

In various embodiments, the type of the input power source is AC or DC.

In various embodiments, the controller module is further configured to monitor the performance of at least one of the energy storage modules and control at least one of the power converter modules corresponding to said at least one of the energy storage modules based on the performance detected.

In various embodiments, the plurality of operating modes of the power converter module further comprises an isolation mode for isolating the corresponding energy storage module from the power bus, and the controller module is configured to switch the power converter module to the isolation mode when the corresponding energy storage module is detected to be faulty based on the performance monitored.

In various embodiments, the controller module is further configured to selectively set the plurality of power converter modules to operate in one of a plurality of operating modes based on a type and a power demand of the electrical load detected.

In various embodiments, the power bus is a source power bus and the power converter system further comprises a load power bus and a plurality of power converter modules connected to the load power bus in parallel, and wherein said each energy storage module is further coupled to the load power bus via a corresponding one of the plurality of power converter modules connected to the load power bus.

In various embodiments, one or more of the power converter modules coupled to the source power bus is operable to transfer power from the input power source to the corresponding one or more energy storage modules and one or more of the power converter modules coupled to the load power bus is operable to transfer power discharged from the corresponding one or more energy storage modules to an electrical load simultaneously.

In various embodiments, the power converter system comprises a plurality of the controller module, wherein each of the power converter modules comprises a respective one of the controller modules.

In various embodiments, each of the plurality of energy storage modules is a hybrid energy storage module comprising at least two types of energy storage devices.

According to a second aspect of the present invention, there is provided a method of manufacturing a power converter system, the method comprising:
  providing a power bus;
  connecting a plurality of power converter modules to the power bus in parallel;
  providing a plurality of energy storage modules, and coupling each energy storage module to the power bus via a corresponding one of the plurality of power converter modules; and
  providing a controller module configured to control at least one of the power converter modules to operate in one of a plurality of operating modes,
  wherein the plurality of operating modes of the power converter module comprises a plurality of charging power conversion modes for connecting an input power source to the corresponding energy storage module for charging power to the corresponding energy storage module.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Embodiments of the present invention provide power converter systems for converting/transferring power (electrical energy) from an input power source in various application such as in electric vehicles (EVs), power distribution systems, and renewable energy conversion systems. In various embodiments, the power converter system may convert/transfer power from the input power source to an energy storage module for charging power to the energy storage module and/or from the input power source to an electrical load for powering the electrical load. In addition, the power converter system may convert/transfer power from the energy storage module to the electrical load for powering to the electrical load.

Figure 1:
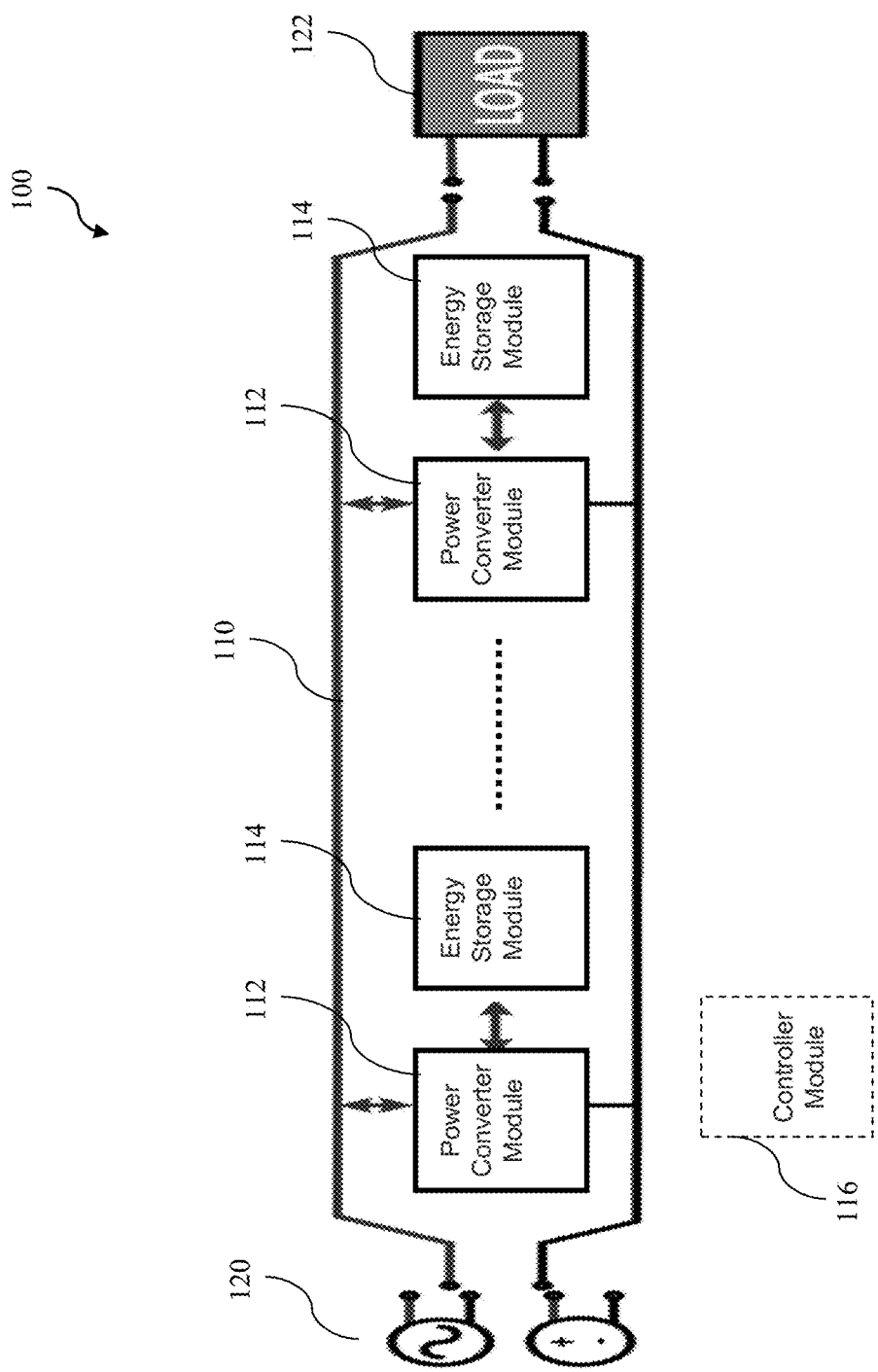
FIG. 1 depicts a schematic drawing of a power converter system according to an embodiment of the present invention.

FIG. 1 depicts a schematic drawing of a power converter system 100 according to an embodiment of the present invention. The power converter system 100 comprises a power bus 110, a plurality of power converter modules 112 connected to the power bus 110 in parallel, a plurality of energy storage modules 114, and a controller module 116 configured to control at least one of the power converter modules 112 to operate in one of a plurality of operating modes. For example, the energy storage module 114 can be made up of any one or more devices capable of storing energy such as batteries and/or super-capacitors. As shown in FIG. 1, each energy storage module 114 is coupled to the power bus 110 via a corresponding one of the plurality of power converter modules 112. In particular, the plurality of operating modes of the power converter module 112 comprises a plurality of charging power conversion modes for connecting an input power source 120 to the corresponding energy storage module 114 for charging power to the corresponding energy storage module 114.

In various embodiments, the controller module 116 may be configured/operable to control all of the plurality of power converter modules 112 in the power converter system 100. In various embodiments, an individual controller module 116 may be provided for controlling a corresponding power converter module 112 (i.e., each power converter module 112 may comprise an individual controller module 116 for controlling the power converter module 112). In various embodiments, the power converter module 112 comprises a power converter circuit configured to be switchable by the controller module 112 to operate in any one of the plurality of operating modes. For example, the power converter circuit may comprise a plurality of switches that may be actuated by the controller module 116 for switching the power converter circuit to operate in any one of the plurality of operating modes. In various embodiments, the controller module 112 may be software module(s) realized by computer program(s) or set(s) of instructions executable by a computer processor to perform the required functions, or may be hardware module(s) being functional hardware unit(s) designed to perform the required functions (actuating the switches in the power converter circuit via a switching signal based on various input parameters so as to form a circuit configuration operable in the desired operating mode). It will also be appreciated that a combination of hardware and software modules may be implemented. Exemplary structural configurations of the power converter module 112 will be described later according to example embodiments of the present invention.

In various embodiments, a circuit may be understood as any kind of a logic implementing entity such as a special purpose circuitry. Thus, in an embodiment, a circuit may be a hard-wired logic circuit or a programmable logic circuit such as a programmable processor, e.g. a microprocessor (e.g. a Complex Instruction Set Computer (CISC) processor or a Reduced Instruction Set Computer (RISC) processor).

In various embodiments, the plurality of charging power conversion modes may comprise an alternating current (AC) to direct current (DC) power conversion mode and a DC to DC power conversion mode. In various embodiments, the plurality of charging power conversion modes may further comprise a DC to AC power conversion mode. The power converter module 112 in the AC to DC power conversion mode is operable to convert AC power to DC power. The power converter module 112 in the DC to DC power conversion mode is operable to convert DC power to DC power having either a higher or lower magnitude (i.e., step-up or step-down). The power converter module 112 in the DC to AC power conversion mode is operable to convert DC power to AC power.

Therefore, since the power converter modules 112 can each be controlled to be in any one of the various operating modes, the power converter system 100 is advantageously able to receive power from various types of input power source (e.g., AC or DC) without requiring separate converters for handling different types of input power source (e.g., converters specifically for handling DC input power sources and converters specifically for handling AC input power sources). The power converter module 112 can thus be referred to as a multi-functional power converter module. As a result, the number of power converter modules 112 required in the power converter system 100 can be minimized resulting in a lower component count in the power converter system 100.

In various embodiments, the plurality of operating modes of the power converter module 112 further comprises a plurality of discharging power conversion modes for connecting the corresponding energy storage module 114 to an electrical load 122 for discharging power to the electrical load 122. In various embodiments, the plurality of discharging power conversion modes of the power converter module 112 comprises a direct coupling mode for coupling power from the corresponding energy storage module 114 to the electrical load 122 without power conversion, a DC to AC power conversion mode, and a DC to DC power conversion mode. Therefore, in addition to charging power conversion modes, the power converter modules 112 according to various embodiments can also be controlled/set to operate in one of a plurality of discharging power conversion modes. This further minimizes the number of power converter modules 112 required in the power converter system 100 since separate converters or power converter systems are not required to handle each of the charging and discharging functionalities. Thus, an even lower component count in the power converter system 100 can be achieved. For example, in such embodiments, the power converter modules 112 are connected to the power bus 110 in parallel and are able to operate in a mode to charge power to the energy storage module 114 and are also able to operate in a mode to discharge power to the electrical load 122. In contrast, conventionally, dedicated/separate power converter systems are required for each of the charging and discharging functionalities, which significantly increases that number of power converters required in the power converter systems.

In various embodiments, the controller module 116 is configured to detect a type of the input power source 120 coupled to the power converter system 100 and control at least one of the power converter modules 112 to operate in one of the plurality of operating modes based on the type of the input power source 120 detected. For example and without limitation, the controller module 116 may set the associated power converter module 112 or a number of the power converter modules 112 to be in the AC to DC power conversion mode when the type of the input power source 120 coupled to the power converter system 100 is detected to be AC. As another example, the controller module 116 may set the associated power converter module 112 or a number of the power converter modules 112 to be in the DC to DC power conversion mode when the type of the input power source 120 coupled to the power converter system 100 is detected to be DC.

In various embodiments, the controller module 116 is configured to detect a type of the electrical load 122 connected to the power converter system 100 and control at least one of the power converter modules 112 to operate in one of the plurality of operating modes determined based on the type of the electrical load 122. For example and without limitation, the controller module 116 may set the associated power converter module 112 or a number of the power converter modules 112 to be in the DC to AC power conversion mode when the type of electrical load 122 coupled to the power converter system 100 is detected to be AC. As another example, the controller module 116 may set the associated power converter module 112 or a number of the power converter modules 112 to be in the DC to DC power conversion mode when the type of the electrical load 122 coupled to the power converter system 100 is detected to be DC.

In various embodiments, the controller module 116 (or in the case where each power converter module 112 has an individual controller module 116, a master controller module selected from one of the individual controller modules 116) is further configured to selectively set the plurality of power converter modules 112 to operate in one of a plurality of operating modes based on a type and a power demand of the electrical load 122 detected. For example and without limitation, the controller module 116 may select a number of the power converter modules 112 to operate in a DC to AC power conversion mode when the type of electrical load 122 detected is AC, the number of the power converter modules 112 selected being sufficient to meet the power demand of the electrical load 122.

In various embodiments, the controller module 116 is further configured to monitor the performance of at least one of the energy storage modules 114 and control at least one of the power converter modules 112 corresponding to the at least one of the energy storage modules 114 based on the performance detected. In various embodiments, the plurality of operating modes of the power converter module 112 further comprises an isolation mode for isolating the corresponding energy storage module 114 from the power bus 110, and the controller module 116 is configured to switch the power converter module 112 to the isolation mode when the energy storage module 114 corresponding to the power converter module 112 is detected to be faulty based on the performance monitored. Therefore, this advantageously provides the power converter system 100 with fault tolerant capability.

Figure 2:
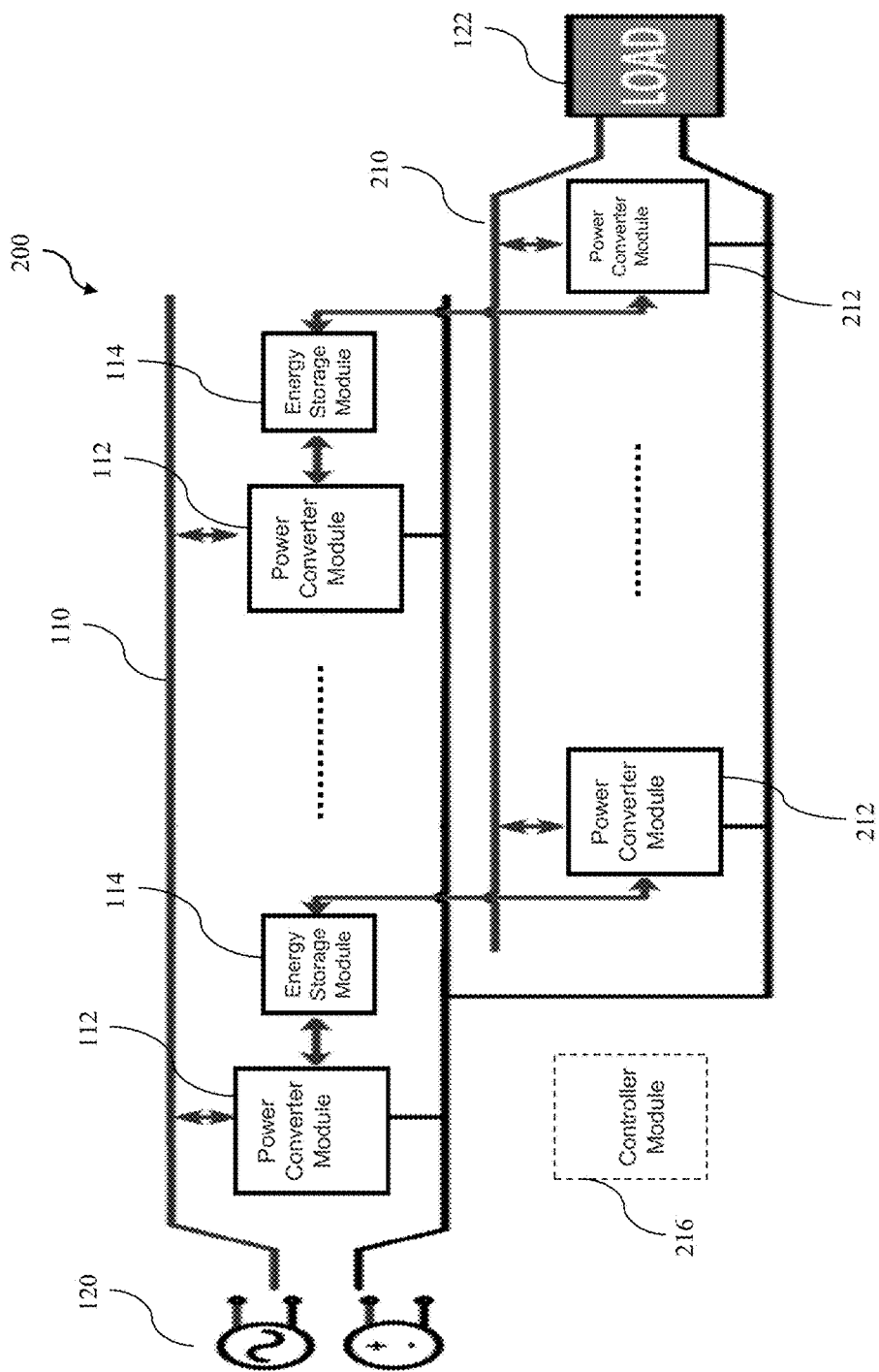
FIG. 2 depicts a schematic drawing of a power converter system according to another embodiment of the present invention.

FIG. 2 depicts a schematic drawing of a power converter system 200 according to an embodiment of the present invention. The power converter system 200 is generally the same as the power converter system 100 as illustrated in FIG. 1, except that another power bus 210 (in particular, a load power bus) is provided for delivering power discharged from the energy storage modules 114 to the electrical load 122, and a plurality of power converter modules 212 are coupled to the load power bus 210 in parallel. It can be understood that the same or similar modules/elements are denoted using the same reference numerals throughout the drawings.

Therefore, in the embodiment of FIG. 2, the power converter system 200 comprises a source power bus 110 for transferring power from the input power source 120 to the energy storage modules 114 for charging the energy storage modules 114 and a load power bus 210 for delivering power discharged from the energy storage modules 114 to the electrical load 122 for powering the electrical load 122. The power converter modules 212 are connected to the load power bus 210 in parallel, and each energy storage module 114 is further coupled to the load power bus 210 via a corresponding one of the plurality of power converter modules 212 connected to the load power bus 210. With this configuration, the power converter system 200 is capable of charging power to the energy storage modules 114 and discharging power from the energy storage modules 114 simultaneously. That is, the power converter module(s) 112 coupled to the source power bus 110 may transfer power from the input power source 120 to charge the energy storage module(s) and the power converter module(s) 212 coupled to the load power bus 210 may transfer power discharged from the energy storage module(s) to the electrical load 122 simultaneously.

Hereinafter, the present invention will be described more fully with reference to the accompanying drawings, in which exemplary embodiments of the invention are shown. This invention may, however, be embodied in many different forms/configurations and should not be construed as limited to the exemplary embodiments set forth herein. Rather, these exemplary embodiments are provided so that the present disclosure will be thorough and complete, and will fully convey the scope of the invention to those skilled in the art.

According to exemplary embodiments of the present invention, multi-functionality power converter systems with multiple energy sources for, e.g., electric vehicle (EV) and power distribution applications are disclosed herein. The power converter system advantageously possesses a self-commissioning (self-configuring) feature that enables re-configuration of the converters (power converter modules) 112 for various source and load types. For example, with reference to the power converter system 100 shown in FIG. 1, the converter 112 may be configured as a level 1 single-phase AC to DC converter during low-power AC plug-in charging of an energy storage (energy storage module) 114 in, e.g., an EV. On the other hand, during high-power level 2 DC plug-in charging of the energy storage 114 in the EV, the same converter 112 can be used to transfer DC power from the input power source 120 to the connected energy storage 114. This is independent of the storage type, such as a high power density energy storage (e.g., supercapacitors based), a high energy density storage (e.g., battery based such as Li-ion batteries), or a hybrid energy storage comprising both high power density energy storage and high energy density storage.

In various embodiments, for converters 112 to adapt to (compatible with) the various energy storage types, the controller 116 is required to have a very good bandwidth and adaptability. For example, the converters 112 may need good bandwidth in order to improve the load transient response. Without wishing to be bound by theory, but the converters 112 may operate at a very high frequency which allows increment in bandwidth. When the converters 112 are operated at a high frequency, the overshoot value in the transient response is significantly lower and the response time also reduces. During large transients, the duty cycle may saturate at its maximum or minimum limit, which limits the response time due to the dynamics of the converters 112. In various embodiments, a feed forward capacitor may be used in/added to the converters 112 to increase the bandwidth while retaining acceptable phase margin.

For example, from the configurations of the power converter systems 100, 200 shown in FIGS. 1 and 2, the advantage of selectable energy sources to meet the load demands can be observed. The configurations also enable redundancy and fault tolerance. The power converter system in various embodiments also possesses the ability to detect the type of input power source 120 (e.g., AC or DC). These features will be described in further details later according to exemplary embodiments of the present invention.

As an example, the configuration of the power converter system 100 as shown in FIG. 1 advantageously enables the same power bus (DC power bus) 110 and the same converters 112 be used to both charge power from an input power source 120 to the energy storage 114 and discharge power from the energy storage 114 to the electrical loads 122 (e.g., machines). In particular, as described hereinbefore, the converters 112 can be controlled or set to one of the charging power conversion modes for transferring power from the input power source 120 to charge the energy storage 114 or one of the discharging power conversion modes for transferring power discharged from the energy storage 114 to the electrical load 122. In an embodiment, high power transients are arranged/programmed to be managed by high power density energy storage. For example, key requirements for the success of EVs may be that the energy storage has to be rapidly charged (generally, the faster the better), and that the energy storage has to live its design life for lower ownership costs. However, conventional energy storage commonly fails to meet these requirements because fast charging/discharging (e.g., in the event of sharp stops such as when an EV is stopped or brakes are applied suddenly, there is a high inrush of current (high transient pulse) back to the energy storage for recovery) significantly reduces the battery life such as by less than half. In the embodiment, a high power density energy storage (e.g., supercapacitors) is configured to store these fast transients. Therefore, rapid charge/discharge transients are arranged to go through a high power density energy storage, which is used in conjunction with a high energy density storage (e.g., batteries) (i.e., a hybrid energy storage comprising a mixture of high power density energy storage devices and high energy density storage devices). This configuration thus relieves the high energy density storage from the high power transients, thereby enhances the useful lifetime of the high energy density storage in the system 100.

As an example, the configuration of the power converter system 200 as shown in FIG. 2 advantageously enables concurrent charging and discharging of the energy sources 114 to be accomplished in real time. This can for example be applied for managing distributed renewable energy sources and loads in a real time environment. In a power distribution network with, for example, renewable energy integration, sizing of converters is very critical. During low power generation conditions, system losses are typically high. For example, in a typical power system using renewable generation, the interface DC to AC converters are mostly over-sized to cater to the peak power loads. Most of the time even during good generating seasons, these converters work at only up to around 50% of their capacity. This increases capital expenditure and operating expenses because of efficiency losses. In contrast, the power converter system 200 according to various embodiments significantly improves efficiency by enabling a modular approach (plug and play approach) that can self-configure (selectively set various converters 112 to the appropriate operating mode based on various input parameters) to achieve a desired overall system function/operation.

As shown in FIG. 2, the converters 112 of the power converter system 200 are connected to the power bus 110/210 in parallel. This provides modularity to the power converter system 200 and therefore, the number of converters 112 required for handling the available power may be chosen by an in-built controller 216. In an example embodiment, the input/output voltages and current are sensed and the sensed voltages and current will be compared with reference voltages and current. In addition, the controller 216 may be configured to ensure that the desired power output is fed to the electrical load 122. The state of health of the energy storage modules 114 may be measured as a function of internal resistance at an initial stage and stored in a memory of the controller 216. The controller 216 may then use the stored initial state of health as a reference to compare with a current state of health and may implement lower current charge discharge rates to provide better lifecycle. This may also be the basis for activating the slow and fast charge modes.

The controller 216 may be configured to connect a renewable source to directly power the load 122 with a high power density energy storage (such as supercapacitors) acting as a filter for rapid changes in input power or a high energy density storage (such as batteries) acting as a filter for slow variations in the input power. For example, a capacitor typically offers very low impedance to high current transients. In the embodiment, this property is exploited to manage charge/discharge characteristics at the pack level. For example, a battery pack (energy storage module 114) may include individual modules and cells prearranged in series and parallel. A cell is the smallest, packaged form a battery pack can take, which may be in the order of one to six volts. An individual module includes numerous cells, which may be connected in either series or parallel. A battery pack is then assembled by connecting individual modules together, again either in series or parallel. In the embodiment, the controller 216 is configured to allow the high frequency currents to bypass the high energy density storage (low power density energy storage) and proceed to the high power density energy storage. This improves the power quality from the power converter system 200 and also enhances the life of low power density energy storage such as batteries as they become decoupled from the high frequency variations of the incoming input power.

The power converter system 100, 200 according to various embodiments of the present invention advantageously provides a single box solution for applications involving power conversion such as EV charging, vehicle propulsion using electric machines, integrated hybrid energy storage for energy harvesting and reserve, renewable energy harvesting and storage in smart grid applications. Preferably, the power converter system 100, 200 comprises three main components, namely, a power converter module 112, an energy storage 114, and a controller unit/module 116/216 for control and monitoring purposes. In various embodiments, the energy storage 114 is of a hybrid type comprises a mixture of various types of energy storage devices including high power density energy storage devices (such as supercapacitors) and high energy density storage devices (such as batteries). The modular and hybrid energy storage units 114 are coupled to the respective multi-functionality power converters 112 with health monitoring and fault tolerant characteristics.

Conventionally, when multiple energy sources of the same or different type are combined to power a load (e.g., in EVs, the load may be the traction motor and in stand-alone energy storage and distribution system, the load may be a 230V home utility or other power converter such as DC to 3 phase AC inverter), there is problem of voltage mismatch between the devices (e.g., between energy storage and input power source, and between energy storage and electrical load) leading to unintended current flow. However, in the power converter system according to various embodiments of the present invention, each of the energy storage systems 114 are coupled to the common DC bus 110 using the multi-functionality power converter 112 which will maintain the same voltage at the DC bus irrespective of the energy storage system voltage. The power electronic controller module 116/216 for each multi-functionality converter 112 is governed by robust algorithms to ensure absolute synchronization among the converters 112. As an example, for a desired power transfer, it may be necessary to maintain a certain voltage difference between the converters 112 and external power buses 110. This is achieved by the controller 116/216 (e.g., the individual controller 116/216 associated with each converter 112). The controllers 116/216 have stored therein algorithms/programs executable by a computer processor for maintaining the DC bus voltage and reducing or increasing the voltage at converter terminals. DC bus voltage and currents at the energy load terminals may be measured through sensors. Directions and phases (in case of AC) of these currents are also measured and the rate of change of currents is evaluated by the master controller (e.g., as mentioned hereinbefore, one of the individual controllers 116/216 may be selected as the master controller). The master controller may then send command signals to the individual controllers to direct the flow of power to or from the energy storage.

In an exemplary embodiment, the power converter system 100 may operate as a motor controller for an EV. For example, when the energy storage system 114 is in the discharge mode, the converter 112 may act as a current source for the motor speed control. In this regard, the speed at a given load is a direct function of the average voltage applied to the motor which is maintained by parallel converters 112. During charging mode, the converter 112 can also be configured to be used for single phase AC charging of the EV, where the converter 112 will act as a rectifier.

The power converter systems 100, 200 as shown in FIGS. 1 and 2 will be described below in further details according to exemplary embodiments of the present invention. The converter 112 may be referred to as a modular multi-functionality converter (MMFC) and the energy storage module 114 may be referred to as an energy storage system (ESS). For example, the power converter system 100 as shown in FIG. 1 having multiple ESSs 114 may be implemented in an EV whereby one MMFC 112 is provided per ESS 114. The power converter system 200 as shown in FIG. 2 may be implemented in a power distribution system. In the power distribution system, as described hereinbefore, the source 120 and load 122 have different/separate power bus and common ground as illustrated in FIG. 2. This arrangement enables the simultaneous power flow from the source 120 to the ESS(s) 114, the ESS(s) 114 to the load 122, and the source 120 to the load 122. Simultaneous charging and discharging of the ESS(s) is important for renewable integration, where the power availability can be utilized to the maximum.

Figure 3:
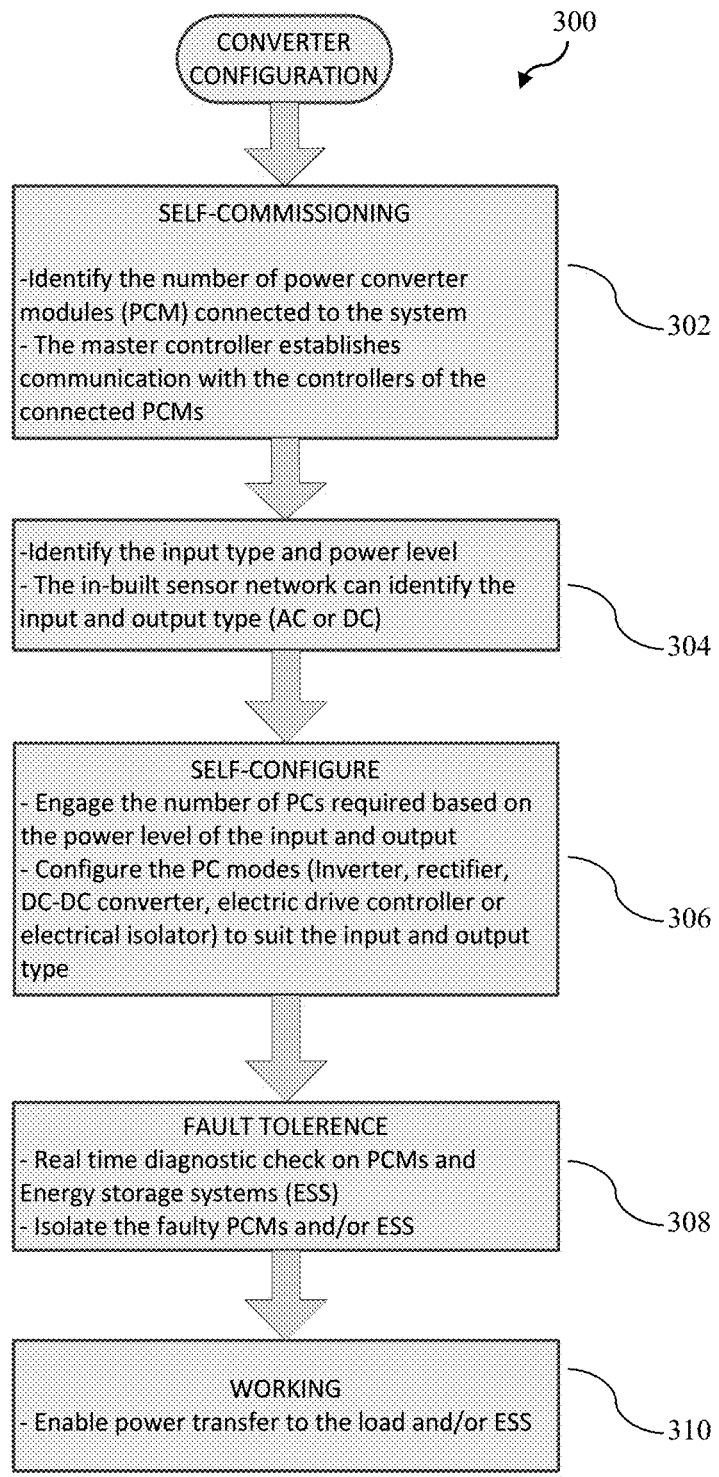
FIG. 3 depicts a sequence of operations for the power converter system overflow according to an example embodiment of the present invention.

As an example only and without limitation, the sequence of operations for the system overflow is shown in FIG. 3 according to an example embodiment of the present invention. The sequence of operations 300 may involve the following stages, namely, self-commissioning 302 (e.g., identifying the number of power converter modules (PCMs) connected to the power converter system 100/200, and the master controller establishing communication with the controllers 116/216 of the connected PCMs), parameters identification 304 (e.g., identifying the input power source type and power level and identifying the load type and power demand), self-configuration 306 (e.g., engaging/selecting the number of PCMs 112 required based on the input power level and load power demand, and configuring/setting the PCMs 112 to be in one of the plurality of operating modes based on the input power source type and the load type), health monitoring/fault tolerance 308 (e.g., real-time diagnostic check on the PCMs 112 and ESSs 114 and isolate the faulty PCMs and/or ESSs), and power conversion 310 (enable power transfer to the load 122 and/or ESS 114). Accordingly, the sequence of operations may generally involve the identification of input power source(s) 120 and electrical load(s) 122, followed by the continuous monitoring through the diagnostics before entering into the power conversion mode. Various states of operations are described below.

Charging State:

For example, the charging state can be explained for (1) slow charging from an AC source and (2) fast charging from DC source.

Figure 4:
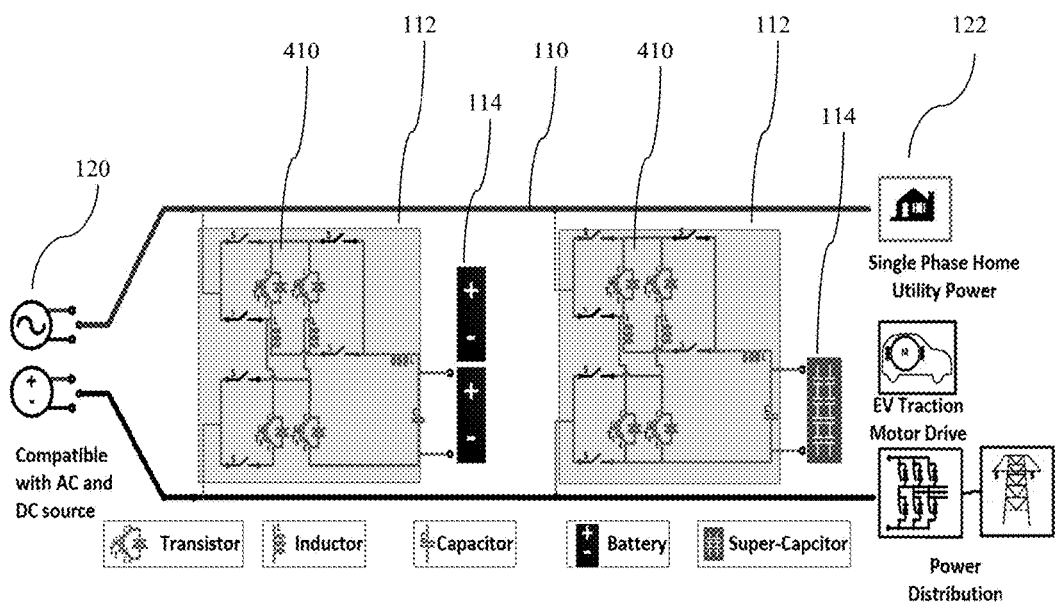
FIG. 4 depicts a schematic drawing of the power converter system showing an exemplary hardware architecture of the converters.

FIG. 4 depicts a schematic drawing of the power converter system 100 showing an exemplary hardware architecture of the converters (MMFCs) 112 according to an example embodiment of the present invention. From FIG. 4, the manner in which power transfer occurs from the source 120 (plug-in AC or DC) to the ESS 114 can be seen. The MMFCs 112 have a communication interface that establishes a handshake with the source 120 and configures itself according to the type of the source 120. In an example embodiment, the communication interface of the MMFC 112 comprises a sensor and a communication bus linking the sensor with the controller 116 of the MMFC 112. This functionality may be carried out through the power line communication so that there is no separate communication line required. In example embodiments, the input power source type may be detected in the following manner. If the input to the communication bus is DC, the magnitude of this signal will not change in sign in a few milliseconds. Therefore, this signal can be determined to be a DC signal. However, for an AC type, the signal will change in sign and thus time averaging can be performed to detect the AC signal by sampling the signal for a certain time period and dividing the sampled signal by the certain time period. Therefore, identification of input power source type may be accomplished by time averaging of sampled source waveform data. Once the source type is known, circuit/hardware (power converter circuit) 410 reconfiguration may be carried out to take AC/DC source 120 as input and deliver a DC output to charge the connected ESS(s) 114. Reconfiguration of the circuit/hardware 410 is controllable by the controller 116 leading to seamless hardware and software modularity of the connected ESSs 114.

Discharge State:

In the discharge state, the MMFC(s) 112 may be controllable to operate in 3 ways: 1) directly couple the ESS(s) 114 to the DC bus 110, 2) act as power converter(s) to provide the output voltage same as the DC bus 110 when the ESS voltage is lower or higher than the DC bus, or 3) act as converter(s) for propulsion DC motors eliminating the need for separate power converters. For example, DC-motors require DC power. Therefore, in this case, the MMFC(s) 112 are configured to provide a DC output to control/power DC-motors.

The self-commissioning feature of the controller 116 will now be described in further details. For example, in the case where all the ESSs 114 are designed to be at the same voltage, then the MMFCs 112 acts gateways to link the ESSs 114 to the DC bus 110, thus connecting the ESSs 114 in parallel. For example, a DC-link capacitor which resembles an ideal voltage source with stiff voltage characteristics can act as a gateway to link the ESSs 114 to the DC bus 110. In the case where the ESSs 114 are at different voltages such as due to aging or due to combining multiple ESSs 114, the MMFCs 112 may boost the voltage to match the DC bus 110. As an example, aging can be detected by measuring the internal resistance of the ESSs 114 by injecting an AC signal at a frequency range of 20 Hz to 1 kHz. In the example, low internal resistance of the batteries enables high current, and rise in internal resistance reduces the capacity. Therefore, aging can be detected by measuring the internal resistance. For example and without limitation, the internal resistance may be determined by injecting a controlled AC signal ($\Delta I = I_{max} \sin(2\pi ft)$) into the two terminals of an ESS 114 such that the voltage response is $\Delta V = V_{max} \sin(2\pi ft + \Phi)$. As the impedance of the ESS 114 may be expressed as $Z(f) = (V_{max}/I_{max})e^{j\Phi}$, the measured impedance will change based on, for example, the number of cycles, stress due to transients, temperature and electrochemical effects. Therefore, aging of the ESS 114 can be detected/determined by comparing the measured impedance against a reference impedance of the ESS 114 which was measured/obtained at initial stage such as when manufacturing the power converter system 100.

For example, a buck-boost converter configuration (which will be described and illustrated later) may be used to boost the DC voltage to match the DC bus 110. Hence the DC bus 110 may see the same voltage at all nodes.

In case of damage of one of the ESSs 114, the corresponding MMFC(s) 112 can isolate the faulty ESS(s) 114 from the power bus 110, while the non-faulty ESSs 114 are still engaged to the power bus 110. The power converter system 100 can thus be referred to as a plug-and-play power converter system. Plug-and-play system is advantageous as the system 100 has the ability to be configured based on the load power demand. For example, in EVs, a number of ESSs 114 can be selectively plugged in to the power train depending on the required range such as for short range vehicle deployment. By way of example only and without limitation, a battery pack for a short range vehicle may be at least 20 kWh, and a longer range vehicle (such as a sport utility vehicle (SUV)) may require 100 kWh for a range of 200 kms. Therefore, depending on the distance to be travelled and load type, the energy storage modules can be selected to cater to the distance range.

Therefore, as all the MMFCs 112 in the power converter system 100 are synchronized in various embodiments of the present invention, the controller 116 in the power converter system 100 can make the system work as a motor control unit. For example, the MMFCs 112 can be synchronized to an external clock. For synchronization, the MMFCs 112 may have following characteristics: voltage outputs within ±0.25% of $V_{OUT}$ nominal; output power run resistance (layout) within ±20% of each other; out-of-phase switching frequency synchronization reduces input and output noise; do not operate the system without minimum load; and use 20% of full load as a minimum load. The controller 116 performs the speed control by providing the required average voltage across DC machine terminals. For example, the MMFC 112 can act as a current source for the motor speed control. The speed at a given load is a direct function of the average voltage applied to the motor which is maintained by the parallel MMFCs 112.

Simultaneous Charge-Discharge State:

For example, this state of operation is applicable for grids where renewable energy source is integrated and simultaneously power demand from the load 122 is also met. In this application, the MMFCs 112 connected to the source bus 110 can act as ESS chargers and one or more ESSs 114 can discharge to the load bus 210 through the set of MMFCs 212 connected to the load bus 210.

The MMFCs 112 can also isolate their respective ESS 114 in case of fault detection. Due to non-identical characteristics and early aging than the expected life of some battery cells of the ESS 114, the entire ESS 114 will show a degraded performance. With continuous monitoring and sensing systems for each ESS 114, such discrepancies are identified and the faulty/inefficient ESSs may be isolated from the power bus 110 to enable the system 200 work independent of the degraded ESS(s) 114. This can be achieved based on the plug and play converter modules as described hereinbefore.

In various embodiments, multiple power conversion and energy storage modules are connected to the same bus. One of the individual controllers (e.g., electronic cards) of the MMFCs 112 may self-configure to be the master controller. When the ESS 114 connected to the corresponding converter 112 is online (i.e., the energy storage is activated), the MMFC electronics and sensor network identifies the type of the ESS 114 connected to it. The master controller also identifies the number of MMFCs 112 connected to the same bus. The self-commissioning routine of the master controller selects slave MMFCs 112 and the connected ESS 114 based on the information gathered from the current sensors. For example, the information collected from the current sensors may be the load information, and the number of MMFCs 112 to be selected can then be determined based on the obtained load information. For example, depending upon the requirements of MMFCs 112, the master controller may run a search routine that seeks information from all the selected MMFCs 112.

Isolation State

The fault tolerant ability is achieved through the isolation feature of the system. The continuous monitoring and sensing of each ESS 114 and converters 112 are carried out by the system diagnostics. As an illustrative example and without limitation, a very weak, slow (e.g., around 1 Hz) AC signal may be applied on the negative wire of the ESS voltage sensor. A fault associated with the ESS 114 may then be detected/determined based on the amount of signal degradation. The diagnostics may run continuously and may update the main controller about the health status of the ESSs 114 and the converters 112. The faulty converters 112 and/or ESSs 114 are de-coupled from the bus 110. For example, referring to FIG. 4, the converters 112 and/or ESSs 114 may be de-coupled from the bus 110 by actuating/setting the switches accordingly, such as by opening all the switches.

Figure 5:
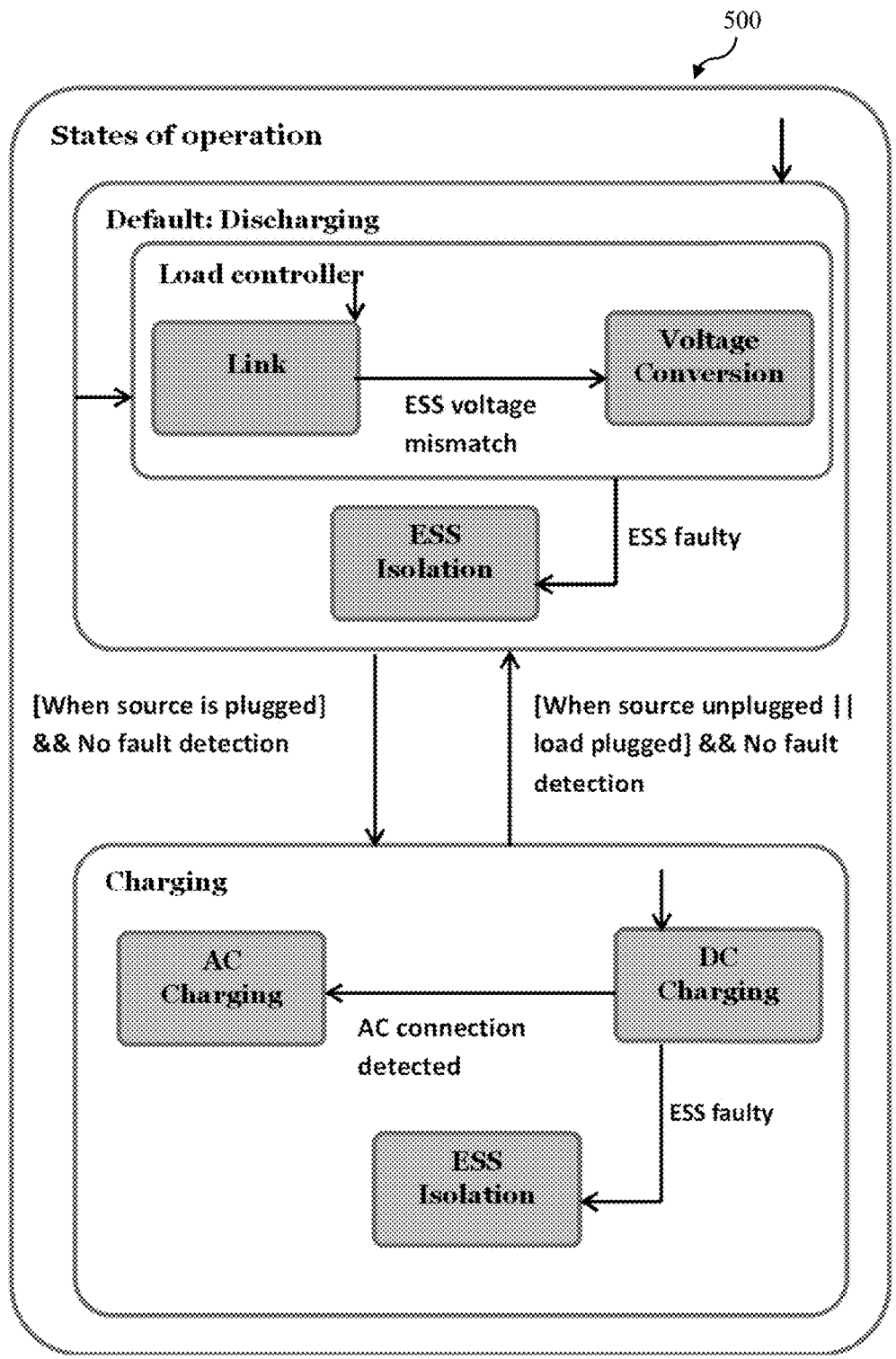
FIG. 5 depicts an exemplary state machine for the functionalities of the power converter system according to an example embodiment of the present invention.

As an exemplary overview and for illustration purposes only, the state machine for the functionalities of the power converter system 100/200 according to an example embodiment of the present invention is shown in FIG. 5. In general, the state machine shows that for the charging operation, a check is performed on the ESSs 114 to determine if there is any faulty ESS(s), and only if the source 120 is connected and the ESSs 114 are in the safe operating zone, the charging will commence, while the faulty ESS(s) 114 are isolated. For the discharging operation, a similar protocol/technique may be followed to identify any faulty ESS(s) and a check is performed to determine whether the source 120 is plugged or unplugged. The discharging mode may then initiate once the load 122 is connected.

Figure 6:
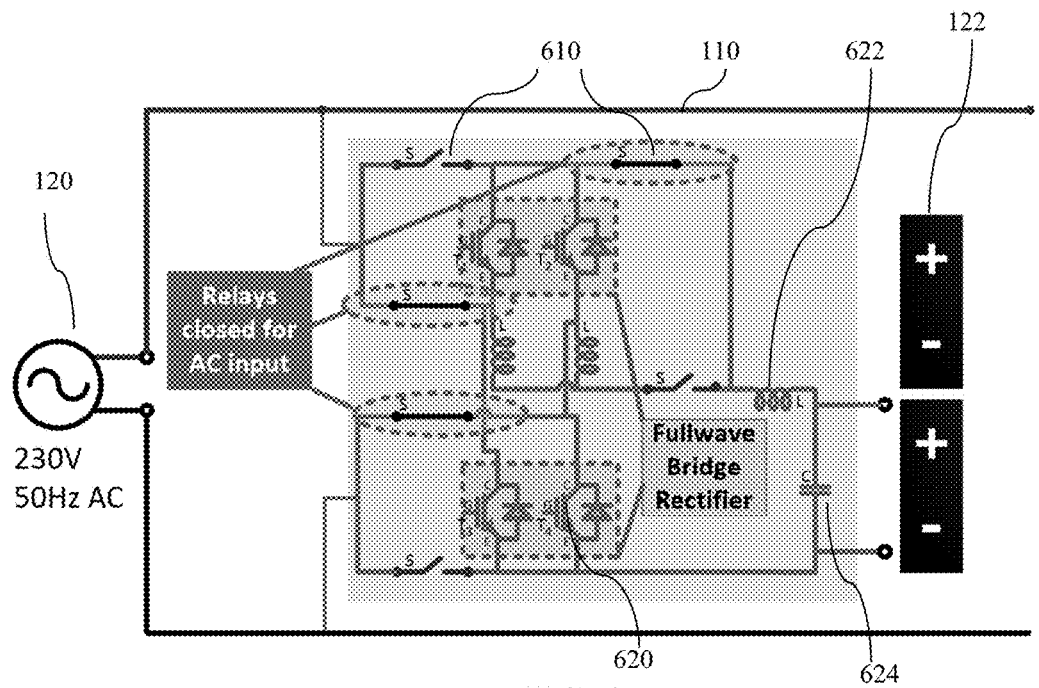
FIG. 6 depicts a state of the converter circuit (state of the switches) when it is controlled to operate in an AC to DC operating mode (i.e., function as a rectifier) according to an example embodiment of the present invention.
Figure 7:
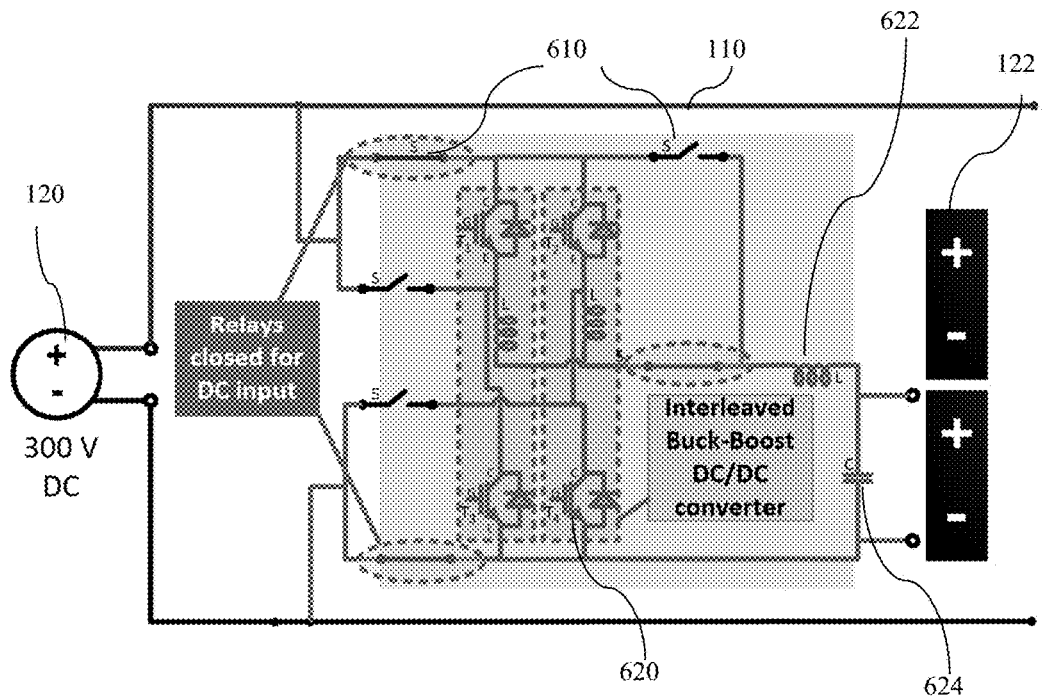
FIG. 7 depicts a state of the converter circuit (state of the switches) when it is controlled to operate in a DC to DC operating mode (i.e., function as a buck-boost DC/DC converter) according to an example embodiment of the present invention.

Exemplary Hardware/Circuit Architecture:

As mentioned hereinbefore, FIG. 4 depicts a schematic drawing of the power converter system showing an exemplary hardware architecture of the converter 112, including the converter circuit/hardware 410 and the energy storage modules/components 114. In the example, the converter circuit 410 disclosed is configurable/switchable to function in various operating modes such as an inverter, a rectifier or a DC-DC converter. In the example embodiment, the converter circuit 410 comprises a plurality of transistors (e.g., insulated-gate bipolar transistors) 620, a plurality of inductors 622, a capacitor 624, and a plurality of switches/relays 610 interconnected in the manner as shown in FIGS. 4, 6 and 7. With this circuit configuration/layout as an example, the converter circuit 410 can be advantageously configured/set by the controller 116/216 to operate in any one of operating modes described herein by actuating the switches 610 to be in an open or close state accordingly. It will be understood by a person skilled in the art that the present invention is not limited to the specific converter circuit layout as shown in FIGS. 4, 6 and 7, and various modifications may be made while still achieving the same or similar functionalities.

As examples, FIGS. 6 and 7 show the state of the converter circuit 410 having switches/relays 610 set/switched to operate in a particular operating mode. FIG. 6 depicts the state of the converter circuit 410 when it is controlled to operate in an AC to DC operating mode (i.e., function as a fullwave bridge rectifier) by setting the switches 610 as shown and FIG. 7 depicts the state of the converter circuit 410 when it is controlled to operate in a DC to DC operating mode (i.e., function as a buck-boost DC/DC converter) by setting the switches 610 as shown. For example, with reference to FIG. 6, the converter circuit 410 may be configured in a DC to AC operation mode (inverter mode) when an input voltage source 120 is not connected/available. The converter circuit 410 may then be operable to convert the power discharged from the energy storage modules 114 (e.g., DC type) to AC power to supply to the load 122. For example, the isolation mode for isolating the corresponding energy storage module 114 from the power bus as described hereinbefore may be obtained by configuring the converter circuit 410 such that all the switches 610 are in an open state. For example, direct coupling mode (i.e., for coupling power directly from the corresponding energy storage module 114 to the electrical load 122 without power conversion) may be obtained by configuring the converter circuit 410 also such that all the switches 610 are in an open state. The isolation mode may generate a specific error code which is different from the direct coupling mode. Power conversion may be realized using a single transistor bridge circuit. The input type, voltage, current and load type, voltage and current information is processed by the controller 116/216. The power converter system 100/200 can thus self-configure/switch the relays 610 to operate in various operating modes such as to act as a rectifier, buck-boost converter or an inverter.

The power converter system 100/200 disclosed herein according to embodiments of the present invention has various applications, such as an EV motor drive, a single phase AC domestic utility and a power distribution using 3-phase inverter.

In various embodiments, each converter 112 is associated with an ESS 114, and cells or basic units that form the ESS 114 will be monitored by an energy management system (EMS) present in the universal power control system (UPCS) (i.e., the master controller). Each ESS 114 is divided into modules, such as high energy density modules (e.g., Li-ion batteries) and high power density modules (e.g., supercapacitors) based on power requirements. The UPCS is configured to select the modules present in the connected an ESS depending upon the source and load requirements. For example, the high power density modules may be activated for a pulse power requirement, and the high energy density modules may be used for a rated constant load. The state of health (SOH) of modules may also be determined by the EMS. The SOH information may be used by the UPCS to calculate the suitable charge and discharge rate of the ESS and also when SOH index is below the pre-determined threshold, the individual module or the whole ESS will be disconnected In an example embodiment, the SOH is monitored based on a technique that is a function of the discharge resistance of the cell at beginning of life and the impedance of the cell measured at that instant.

Figure 8:
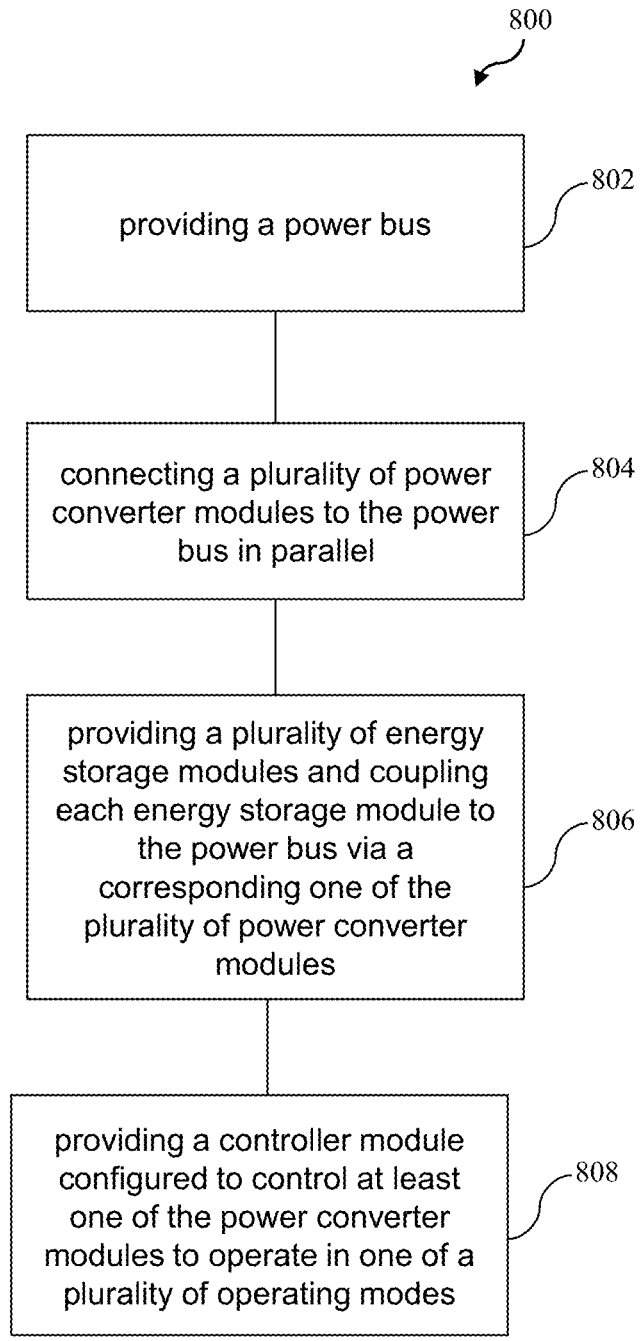
FIG. 8 depicts a schematic flow diagram illustrating a method of manufacturing the power converter system of FIG. 1 according to an embodiment of the present invention.

FIG. 8 depicts a schematic flow diagram 800 illustrating a method of manufacturing a power converter system as described hereinbefore according to an embodiment of the present invention. The method 800 comprises a step 802 of providing a power bus, a step 804 of connecting a plurality of power converter modules to the power bus in parallel, a step 806 of providing a plurality of energy storage modules and coupling each energy storage module to the power bus via a corresponding one of the plurality of power converter modules; and a step 808 of providing a controller module configured to control at least one of the power converter modules to operate in one of a plurality of operating modes. In particular, the plurality of operating modes of the power converter module comprises a plurality of charging power conversion modes for connecting an input power source to the corresponding energy storage module for charging power to the corresponding energy storage module.

Accordingly, the power converter systems described herein according to various embodiments possess a number of advantages over conventional systems. For example, low component count is achieved by using same components for multiple functions. For example, parallel converters are used to both charge and discharge the energy storage. Similarly, DC-bus is exploited for connecting the source to the energy storage and also the energy storage to the load. During regeneration, the DC-bus voltage is allowed to swell and the excess energy is transferred to the super-capacitors connected across the bus. Parallel connected high power density super-caps are ideal filters for fast transients both for EV and grid applications. Lower component count reduces the weight of the electrical system and improves reliability. The power converter system is also fault tolerant. The system can power the vehicle even if one of the energy sources is damaged. In various embodiments, two layers of protection are provided to isolate the faulty energy source. The first is converter and the second is through the intermediate switches that function like re-configuring relays.

The power converter system is adaptable to both AC and DC inputs and provides AC and DC output. This augurs well for both slow and fast charging of EVs and also a wind power or PV source. The power converter system is scalable and also can selectively choose the appropriate number of converters working at a time to maximize the efficiency of energy harvest. The power converter module is self-configurable as a rectifier, inverter or DC-DC converter. Interconnected multiple modules can have synchronized control. The power converter module can also handle more than one type of ESS. The power converter system identifies the type of ESS and selects the suitable storage depending on the operation.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A power converter system comprising:
   a power bus;
   a plurality of power converter modules connected to the power bus in parallel;
   a plurality of energy storage modules, each energy storage module coupled to the power bus via a corresponding one of the plurality of power converter modules; and
   a controller module configured to control at least one of the plurality of power converter modules to operate in each of a plurality of charging power conversion modes, each charging power conversion mode configured for connecting an input power source to the corresponding energy storage module for charging power to the corresponding energy storage module,
   wherein the at least one power converter module is configured to be switchable by the controller module to operate in any one of the plurality of charging power conversion modes.

2. The power converter system according to claim 1, wherein the plurality of charging power conversion modes comprises an alternating current (AC) to direct current (DC) power conversion mode and a DC to DC power conversion mode.

3. The power converter system according to claim 2, wherein the plurality of charging power conversion modes further comprises a DC to AC power conversion mode.

4. The power converter system according to claim 1, wherein the plurality of operating modes of the at least one power converter module further comprises a plurality of discharging power conversion modes for connecting the corresponding energy storage module to an electrical load for discharging power to the electrical load.

5. The power converter system according to claim 4, wherein the plurality of discharging power conversion modes of the at least one power converter module comprises a direct coupling mode for coupling power from the corresponding energy storage module to the electrical load without power conversion, a DC to AC power conversion mode, and a DC to DC power conversion mode.

6. The power converter system according to claim 1, wherein the at least one power converter module comprises a power converter circuit configured to be switchable by the controller module to operate in any one of the plurality of operating modes.

7. The power converter system according to claim 6, wherein the power converter circuit comprises a plurality of switches that may be actuated by the controller module for switching the power converter circuit to operate in any one of the plurality of operating modes.

8. The power converter system according to claim 6, wherein the controller module is configured to detect a type of the input power source coupled to the power converter system and control the at least one power converter module to operate in one of the plurality of operating modes based on the type of the input power source detected.

9. The power converter system according to claim 6, wherein the controller module is configured to detect a type of an electrical load connected to the power converter system and control the at least one power converter module to operate in one of the plurality of operating modes determined based on the type of electrical load detected.

10. The power converter system according to claim 8, wherein the type of the input power source is AC or DC.

11. The power converter system according to claim 1, wherein the controller module is further configured to monitor the performance of at least one of the plurality of energy storage modules and control the at least one power converter module corresponding to said at least one of the energy storage modules based on the performance detected.

12. The power converter system according to claim 11, wherein the plurality of operating modes of the at least one power converter module further comprises an isolation mode for isolating the corresponding energy storage module from the power bus, and the controller module is configured to switch the at least one power converter module to the isolation mode when the corresponding energy storage module is detected to be faulty based on the performance monitored.

13. The power converter system according to claim 1, wherein the controller module is further configured to selectively set the plurality of power converter modules to operate in one of the plurality of operating modes based on a type and a power demand of the electrical load detected.

14. The power converter system according to claim 1, wherein the power bus is a source power bus and the power converter system further comprises a load power bus and a plurality of power converter modules connected to the load power bus in parallel, and wherein said each energy storage module is further coupled to the load power bus via a corresponding one of the plurality of power converter modules connected to the load power bus.

15. The power converter system according to claim 14, wherein one or more of the plurality of power converter modules coupled to the source power bus is operable to transfer power from the input power source to corresponding one or more of the plurality of energy storage modules, and one or more of the plurality of power converter modules coupled to the load power bus is operable to transfer power discharged from the corresponding one or more of the plurality of energy storage modules to an electrical load simultaneously.

16. The power converter system according to claim 1, comprising a plurality of the controller module, wherein each of the plurality of power converter modules comprises a respective one of the plurality of controller modules.

17. The power converter system according to claim 1, wherein each of the plurality of energy storage modules is a hybrid energy storage module comprising at least two types of energy storage devices.

18. A method of manufacturing a power converter system, the method comprising:

providing a power bus;

connecting a plurality of power converter modules to the power bus in parallel;

providing a plurality of energy storage modules, and coupling each energy storage module to the power bus via a corresponding one of the plurality of power converter modules; and providing a controller module configured to control at least one of the plurality of power converter modules to operate in each of a plurality of charging power conversion modes, each charging power conversion mode configured for connecting an input power source to the corresponding energy storage module for charging power to the corresponding energy storage module, wherein the at least one power converter module is configured to be switchable by the controller module to operate in any one of the plurality of charging power conversion modes.

* * * * *